Patented Mar. 14, 1933

1,901,313

UNITED STATES PATENT OFFICE

LEO MANN, OF PROVIDENCE, RHODE ISLAND, ASSIGNOR TO HARRY DEXTER PECK, OF PROVIDENCE, RHODE ISLAND

HEAT-PRODUCING COMPOUND

No Drawing.   Application filed November 11, 1931.   Serial No. 574,360.

This invention relates to improvements in heat-producing compounds. More especially it has to do with increasing the effectiveness of compounds similarly employed for producing heat by electrochemical reaction.

The primary object of this invention is to provide a compound or composition of matter particularly adapted for use in a flexible container, for example a fabric bag, which may be employed therapeutically. Heretofore the major elements of my proposed compound have been used primarily in dry cells or electric batteries although comparable mixtures have indeed been employed in heating packs or bags. It is a feature of my invention to add certain salts to these heretofore used mixtures and certain other elements, hereinafter termed retardents, and thereby increase the effectiveness of the composition and enhance or augment the effects previously attained.

More specifically my improvements reside in adding to a mixture of a metal a depolarizer and an electrolyte, salts of the principal metal and salts of the metallic constituent of the depolarizer for I have found that by such addition the normal action of both the metal and the depolarizer is materially increased or accelerated. I also prefer to add an element, preferably of a non-metallic character, which is of lower electrode potential in the electrochemical series than the metal employed. Since in the specific use contemplated for my mixture, the reaction is initiated by the abrupt addition of water, I provide retardents which in effect tend to distribute the action over a desired period of time and, when such period is ended, to hasten the termination of the reaction.

It is intended that the patent shall cover by suitable expression in the appended claims whatever features of patentable novelty exist in the invention disclosed.

In the ordinary dry cell there is usually an external metal shell, an internal rod of carbon and between them is a mixture of powdered graphite, a depolarizer—usually a manganese depolarizer such as manganese dioxide—some electrolyte-forming salts, and water. When the metal shell and carbon rod are externally connected, current flow is established due to the electro-chemical reactions that occur. The metal tends to go into solution and in so doing effects the accumulation of atomic hydrogen about the carbon rod. The depolarizer then reacts chemically or catalytically with this atomic hydrogen to convert it into water, which in turn reacts with the electrolyte-forming salts. Thus the reaction proceeds almost continuously, the prime effect being the external current flow. There is, however, a simultaneous degradation of some of the constituents of the cell and when this is so of the metal present the reaction is in fact one of corrosion. Since this is incidental to the major function of the cell, the heat resulting from the corrosion is not utilized or appreciated. But it has been recognized that if the metallic corrosive action be primarily enhanced and controlled certain predetermined heat effects may be attained.

In making practical use of this recognition of heat production by electrochemical reactions, the metal and so-called cathodic substance of the dry cell is prepared in comminuted form and intimately mixed with the depolarizer and electrolyte-forming salts. When water is later added to this mixture, the principal effect noted is the evolution of heat, though there is no doubt a current produced analogous to that externally noted with the dry cell. Instead of this current being concentrated along a single conductor, it is distributed, as it were, between a myriad of cells having spatial connection. Each particle of metal forms a pole and each particle of cathodic substance forms another pole. These particles are so thoroughly and closely intermixed that the current, or more properly speaking the ionic flow, occurs between the poles with no appreciable electrical effect. On the contrary the major transfer of energy is in the form of heat. This follows from the very nature of the mixture because the electrical energy produced is quantitatively transformed into heat according to Faraday's law.

I have found that the corrosive action or heat generation of such a mixture is greatly increased or augmented by employing as the electrolyte-forming salts, certain salts of the particular metal and of the metallic constituent of the depolarizer used in the mixture. For example if finely comminuted iron is the major metal of the composition, I prefer to use ferric chloride and ferrous sulfate in addition, and if a manganese depolarizer is used I add manganese chloride and manganese sulfate. The presence of these salts tends to increase the potential of the metal particles and accelerates the corrosion, and also speeds up and increases the depolarizing effect of the depolarizer. Further I have found that salts of other metals present, even in very small amounts, intensify the effect that the metal itself would exert on the reaction. Accordingly I wish it to be understood that my discovery is not limited to specific salts of specific metals but is to be deemed broadly covering the addition of salts which have an intensifying effect on the reaction. For example other salts such as acetates, resinates, oleates and linoleates will have a decided effect on the heat reaction.

As a depolarizer I prefer to use manganese hydroxide which is known commercially as manganese hydrate precipitated. This is free of manganese dioxide which has been extensively used heretofore as the depolarizer in similar mixtures. Manganese hydrates are of two types, the first type being prepared by leaching the manganese ore, treating with sulfuric acid, followed by a drying and sintering process. The product is a popular article of commerce and probably contains a percentage of the dioxide.

The second type of hydrate, and the one I prefer to employ, is substantially pure manganese hydroxide hydrated. Its actual structure is not definitely known, so far as I am aware, but it is a vigorous depolarizer, being very much more active than either the dioxide or the popular hydrate of the first type. Its action is normally so great that when used at all in dry cells, it is diluted with the first type of hydrate.

Although as stated I prefer to employ manganese hydroxide or manganese hydrate precipitated, I do not wish to be understood as precluding the use of other possible depolarizers. For example, iron rust obtained by wetting finely divided iron and letting it naturally corrode for a period of time, hexamethyltetraethyleneamine, known as hexa in the rubber accelerator art, have special effects as depolarizers. And a third type of manganese hydrate, prepared from what is called Waldon's mud, a by-product of chlorine manufacture, may also be used.

With the finely powdered metal, salts and depolarizer above mentioned, I use also graphitic carbon, for I find that it not only produces a more rapid evolution of heat but enables a high heat to be maintained for longer periods. With iron of 60/80 mesh I find it desirable to use graphite of substantially 98% purity and of 300 or greater mesh. Since the cell formation is largely dependent upon the close association of the graphitic carbon and iron particles, the per cent purity and physical state of the carbon has an appreciable influence. I have found that a ratio of 17 ounces of 60 mesh iron and 30 grains of 300 mesh 98% pure graphitic carbon is highly satisfactory, although the quantity of carbon may be somewhat increased or diminished without materially varying the effectiveness of the composition.

When the mixture is employed in heating packs, the heat generating action is started by merely adding water. Since this is introduced in an appreciable amount it is desirable to restrict its possible immediate effect in order that the reaction may be distributed over an extended period. It is well known that certain substances such as kieselguhr, silica gel, sodium and other silicates have the property of retaining moisture. When such substances are added to the composition under consideration, their effect may be likened to that of a restricting valve in a supply pipe, because they apparently absorb the water as it is added and then give it up again gradually as the reaction continues. These substances also have a protective effect if the mixture is unduly exposed to an atmosphere which is excessively humid. Any moisture entering the mixture from this atmosphere is taken up by these absorptive substances or retardents and later given off into the atmosphere when drier conditions prevail, thus preventing unintentional reaction and saving the life of the mixture. Morever when water is added to the composition for generation of heat, it is more thoroughly diffused because of the presence of these retardents and when but little water remains, it will be entrapped, as it were, by these retardents, thus abruptly terminating the heating reaction.

I have found that the so-called cooling of the mixture after the heat generating has terminated is also speeded up by the presence of certain salts, for examples salts of manganese, zinc and lead which are commonly used in the manufacture of paint and varnish as so-called driers. The manganese salts heretofore mentioned as accelerating or intensifying the depolarizing action likewise act as driers to accelerate the cooling off or drying of the mixture after the heat reaction has ceased. This double function of these salts is a discovery so far as I am aware.

As a particular example of a composition which I have found satisfactory I give the following details.

| | |
|---|---|
| Iron, 60 mesh | 17 ounces |
| Manganese hydroxide (manganese hydrate precipitated) | 1 ounce |
| Graphitic carbon | 30 grains |
| Ferric chloride | 30 grains |
| Ferrous sulfate | 30 grains |
| Manganese chloride | 30 grains |
| Manganese sulfate | 30 grains |

To the above may be added some form of silica such as kieselguhr, silica gel, sodium silicate and the like, in quantity approximating 30 grains. Such a composition of matter is placed in a suitable container such as a fabric or canvas bag and when heat is desired, from two to three tablespoonsful of water is added and the bag slightly shaken or kneaded to aid in the initial distribution of the water. Heat is promptly generated to a predetermined maximum temperature and maintained at this temperature for several hours. There is no staining of the container or liberation of any odors. At the termination of the heat period the contents cool very quickly and become substantially dry. When heat is again needed more water is added as before and the cycle repeats. Eventually when the metal has been completely corroded a new charge of material must be placed in the bag.

I claim:

1. A composition of matter for producing heat upon the addition of water comprising, in combination, a metal, an element of cathodic relation to said metal, a depolarizer and electrolyte-forming salts of said metal and the metallic constituent of said depolarizer.

2. A composition of matter for producing heat upon the addition of water comprising, in combination, a metal, an element of cathodic relation to said metal, a depolarizer and electrolyte-forming salts of said metal and said depolarizer.

3. A composition of matter for producing heat upon the addition of water comprising, in combination, a metal, graphitic carbon, manganese hydroxide and electrolyte-forming salts of the metal and manganese salts.

4. A composition of matter for producing heat upon the addition of water comprising, in combination, iron, graphitic carbon, manganese hydroxide, iron salts and manganese salts.

5. A composition of matter for producing heat upon the addition of water comprising, in combination, iron, graphitic carbon, manganese hydroxide, ferric chloride, ferrous sulfate, manganese chloride and manganese sulfate.

6. A composition of matter for producing heat upon the addition of water comprising, in combination, the following constituents,

| | |
|---|---|
| Iron | 17 ounces |
| Manganese hydroxide | 1 ounce |
| Graphitic carbon | 30 grains |
| Ferric chloride | 30 grains |
| Ferrous sulfate | 30 grains |
| Manganese chloride | 30 grains |
| Manganese sulfate | 30 grains |

7. A composition of matter for producing heat upon the addition of water comprising, in combination, a metal, an element of cathodic relation to said metal, a depolarizer, electrolyte-forming salts of said metal and of the metallic constituent of said depolarizer, and silica.

8. A composition as set forth in claim 7 in which the silica is in the form of kieselguhr.

9. A composition as set forth in claim 7 in which the silica is in the form of silica gel.

10. A composition as set forth in claim 7 in which the silica is in the form of sodium silicate.

Signed at Providence, Rhode Island, this 9th day of November, 1931.

LEO MANN.